United States Patent
Chidambaran et al.

(10) Patent No.: US 7,058,010 B2
(45) Date of Patent: Jun. 6, 2006

(54) CONTROLLED SWITCHOVER OF UNICAST AND MULTICAST DATA FLOWS IN A PACKET BASED SWITCHING SYSTEM

(75) Inventors: P K Chidambaran, Santa Clara, CA (US); Thomas A Hoch, Boxborough, MA (US); John Patrick Jones, Westford, MA (US); Andrew A Long, Northborough, MA (US); Prasasth R Palnati, Westford, MA (US); Raymond J Schmidt, Stoughton, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 1042 days.

(21) Appl. No.: 09/820,521

(22) Filed: Mar. 29, 2001

(65) Prior Publication Data

US 2002/0141344 A1 Oct. 3, 2002

(51) Int. Cl.
*H04L 12/26* (2006.01)

(52) U.S. Cl. ............... 370/218; 370/236; 370/241.1; 709/239; 714/2

(58) Field of Classification Search ......... 370/216–220, 370/225, 228, 236, 241.1, 242, 248, 386, 370/389, 392, 396; 385/16, 17; 709/200, 709/208, 239, 242; 714/2, 4, 6, 11–13
See application file for complete search history.

(56) References Cited

U.S. PATENT DOCUMENTS

| 4,710,916 A | * | 12/1987 | Amstutz et al. ........... 370/424 |
| 5,130,984 A | * | 7/1992 | Cisneros ................... 370/399 |
| 5,802,050 A | * | 9/1998 | Petersen et al. ........... 370/394 |
| 6,332,198 B1 | * | 12/2001 | Simons et al. ................ 714/6 |
| 6,590,870 B1 | * | 7/2003 | Mellberg ................... 370/249 |
| 6,741,553 B1 | * | 5/2004 | Grenier ..................... 370/218 |
| 6,763,024 B1 | * | 7/2004 | Law et al. ............... 370/395.1 |
| 6,795,393 B1 | * | 9/2004 | Mazzurco et al. .......... 370/217 |

* cited by examiner

*Primary Examiner*—Wellington Chin
*Assistant Examiner*—John Shew
(74) *Attorney, Agent, or Firm*—M. J. Hodulik

(57) ABSTRACT

The present invention is a methodology for controlled switchover of unicast and multicast data flows in packet based switching system. In some cases it is advantageous to purposefully support switchover of flows from one path to the other without causing loss of data. This is termed a "controlled" or "hitless" switchover. In accordance with the present invention switchover methodology, given that an ingress arbiter device is transmitting to both cores simultaneously, it is required that the flows to both switching cores be synchronized at an aggregator level and that an egress arbiter be given time to cease receiving packets from one Core then switch over to the other Core, and continue receiving packets.

30 Claims, 11 Drawing Sheets

END TO END TEST CELL FLOW, ARB<>ARB

LTC GENERATOR TABLE

| x,y (10 bits) INDEX (1K) | ENABLE TX FOR FLOW | | | | | | | | POINTER TO NEXT FLOW (10 bits) |
|---|---|---|---|---|---|---|---|---|---|
| | Z7 | Z6 | Z5 | Z4 | Z3 | Z2 | Z1 | Z0 | |
| 0 | 1/0 | 1/0 | 1/0 | 1/0 | 1/0 | 1/0 | 1/0 | 1/0 | |
| ... | 1/0 | 1/0 | 1/0 | 1/0 | 1/0 | 1/0 | 1/0 | 1/0 | |
| 1048 | 1/0 | 1/0 | 1/0 | 1/0 | 1/0 | 1/0 | 1/0 | 1/0 | |

LTC GENERATOR FIELD DEFINITIONS

| FIELD | DEFINITION |
|---|---|
| Z7–Z0 | ENABLE TEST CELL GENERATION FOR THE PARTICULAR Z FLOW. 1 = SEND LTC ON FLOW 0 = DO NOT SET LTC ON FLOW |
| PTR | POINT TO NEXT LOCATION OR NEXT FLOW IN THIS TABLE THAT CONTAINS TEST CELL INFORMATION TO SEND. |

*FIG. 9*

LTC RECEIVER TABLE

| x,y (10 bits) INDEX (1K) | ENABLE CHECK [7:0] | | ENABLE CHECK [7:0] | | CELL RCVD [7:0] | | FAULT [7:0] | | COUNT [9:0] | | ERROR CNT [3:0] | ERROR CNT [3:0] |
|---|---|---|---|---|---|---|---|---|---|---|---|---|
| | CORE 0 | CORE 1 | CORE 0 | CORE 1 | CORE 0 | CORE 1 | CORE 0 | CORE 1 | CORE 0 | CORE 1 | CORE 0 | CORE 1 |
| 0 | xxxxxxxx | xxxxxxxx | xxxxxxxx | xxxxxxxx | xxxxxxxx | xxxxxxxx | xxxxxxxx | xxxxxxxx | xxxxxxxxxx | xxxxxxxxxx | xxxx | xxxx |
| ... | xxxxxxxx | xxxxxxxx | xxxxxxxx | xxxxxxxx | xxxxxxxx | xxxxxxxx | xxxxxxxx | xxxxxxxx | xxxxxxxxxx | xxxxxxxxxx | xxxx | xxxx |
| 1023 | xxxxxxxx | xxxxxxxx | xxxxxxxx | xxxxxxxx | xxxxxxxx | xxxxxxxx | xxxxxxxx | xxxxxxxx | xxxxxxxxxx | xxxxxxxxxx | xxxx | xxxx |

LTC GENERATOR FIELD DEFINITIONS

| FIELD | DEFINITION |
|---|---|
| ENABLE CHECK | ENABLE TEST CELL VERIFICATION FOR THAT x.y.z. |
| CELL RCVD | SET WHEN A CELL COMES IN ON A FLOW. CLEARED BY TABLE CHECKER. |
| FAULT | SET WHEN A LINK IS DECLARED FAULTED, RESET WHEN LINK IS DECLARED GOOD. |
| COUNT | START COUNTING UP WHEN THE TABLE HAS BEEN SCANNED AND ENABLE IS SET FOR A FLOW BUT A LTC HAS NOT BEEN RECEIVED ON THAT FLOW. WHEN THE PROGRAMMABLE THRESHOLD THAT INDICATES WHEN TO FLAG A FLOW AS BAD IS REACHED, AND INTERRUPT WILL BE GENERATED TO THE PROCESSOR INTERFACE. ANY Z CAN BE 'BAD' FOR THE COUNT TO INCREMENT FOR THE x.y. WHEN THERE ARE NO ERRORS AFTER AN ERROR CONDITION, THIS WILL START TO COUNT THE NUMBER OF GOOD CHECK CYCLES FOR A FLOW. AFTER THE PROGRAMMABLE THRESHOLD THAT INDICATES WHEN A FLOW IS CONSIDERED GOOD IS REACHED THE FLOW IS DECLARED GOOD AND THE PROCESSOR IS NOTIFIED VIA AN INTERRUPT IF ENABLED. |
| ERROR CNT | COUNT OF TEST CELLS WITH FIXED PAYLOAD ERRORS. |

*FIG. 10*

CONTROLLED SWITCHOVER OF UNICAST AND MULTICAST DATA FLOWS IN A PACKET BASED SWITCHING SYSTEM

RELATED APPLICATION

This application is related to U.S. patent application Ser. No. 09/748,419, entitled Apparatus And Method For Flow Path Based Fault Detection And Service Restoration In A Packet Based Switching System (Hoch 2-2-2-2-2-2) and filed Dec. 26, 2000, the content of that patent application being incorporated herein by reference.

FIELD OF THE INVENTION

The present invention relates generally to communication systems and more particularly to packet switching systems having redundancy protection.

BACKGROUND OF THE INVENTION

Multiservice switches used, for example, by communications providers in wide area networks typically provide a number of different interfaces for incoming and outgoing communications traffic to the core switching fabric in order to accommodate customer needs. These interfaces can range, for example, from high rate optical trunking ports to lower rate electrical interfaces. In general, the different interfaces are provided through service specific equipment grouped together on what are termed "service shelves", where the service shelves then couple to the switching core. A typical service shelf will include the physical layer interface which couples to higher layer service cards (e.g. layer 2 or 3 for ATM or IP) and then to the switching core. Failure protection of equipment utilized in multiservice switches usually in the form of redundant circuit paths is also extremely important in order to provide the type of reliability that is necessary for these switches. That is, the ability to detect faults in a packet switching system and restore service quickly is an important issue in overall availability to the customer. Extra service cards (or protection cards) and even redundant switching cores are often provided within a service shelf to allow for the required fault protection.

In prior art multiservice switches of the type described above, in order to perform maintenance on a portion of the switch, e.g. replacing a service card, it was required that all data flows in the switch be transitioned from one core to the other. This transition is typically accomplished in a relatively uncontrolled manner causing cell drops or other Quality of Service (QoS) disruptions to user data. Moreover, prior art switchover methodologies required that the redundant switching cores be aligned in time to some small percentage of a packet period or multiples thereof, thereby further complicating the equipment design and switchover task. A need therefore exists for a simplified switchover methodology without cell loss in a multiservice switch that does not require synchronization of the redundant cores and that may be utilized to control portions of the overall data flow.

SUMMARY OF THE INVENTION

The present invention is a methodology for controlled switchover of unicast and multicast data flows in packet based switching system. In some cases it is advantageous to purposefully support switchover of flows from one path to the other without causing loss of data. This is termed a "controlled" or "hitless" switchover. For example, it may be required to upgrade or replace a card and it is desirous to do this without taking an "Errored Second" hit at the system level.

In accordance with the present invention switchover methodology, given that an ingress arbiter device is transmitting to both cores simultaneously, it is required that the flows to both switching cores be synchronized at an aggregator level and that an egress arbiter be given time to cease receiving packets from one Core then switch over to the other Core, and continue receiving packets. The mechanism to support this is the indication of EOF, "End of Flow" and SOF "Start Of Flow" from arbiter to aggregator in a special test cell. Starting from the ingress side a master aggregator is determined and the other aggregator becomes a slave. The arbiter in line with the traffic going to both aggregators inserts an EOF indication to the aggregators that causes the aggregators to both stop data flow of a specific VOQ selected. In order to synchronize the flows, the slave aggregator indicates to the master aggregator when it has stopped traffic on a particular flow. When the master aggregator has also stopped traffic it indicates this to the egress arbiter via the EOF indicator that also tells the egress arbiter which core to switch to. When the egress arbiter has received an EOF from both aggregators it can switch over.

To restart data flow the aggregator sends a SOF cell to the egress arbiter and traffic continues as usual. Thus, a controlled hitless switchover can be supported on a per connection/VOQ flow basis as well as on a per leaf basis of a Multi-cast group.

BRIEF DESCRIPTION OF THE DRAWINGS

A more complete understanding of the present invention may be obtained from consideration of the following detailed description of the invention in conjunction with the drawing, with like elements referenced with like references, in which:

FIG. 9 shows an exemplary link test cell generator table;

FIG. 10 shows an exemplary link test cell receiver table; and

DETAILED DESCRIPTION

Multiservice switches used by communications providers for wide area networks typically provide a number of different interfaces for access to and from the core switching fabric in order to accommodate customer needs. As discussed in the background, the different interfaces may be provided through service shelves which then couple to the switching core.

Figure 1:
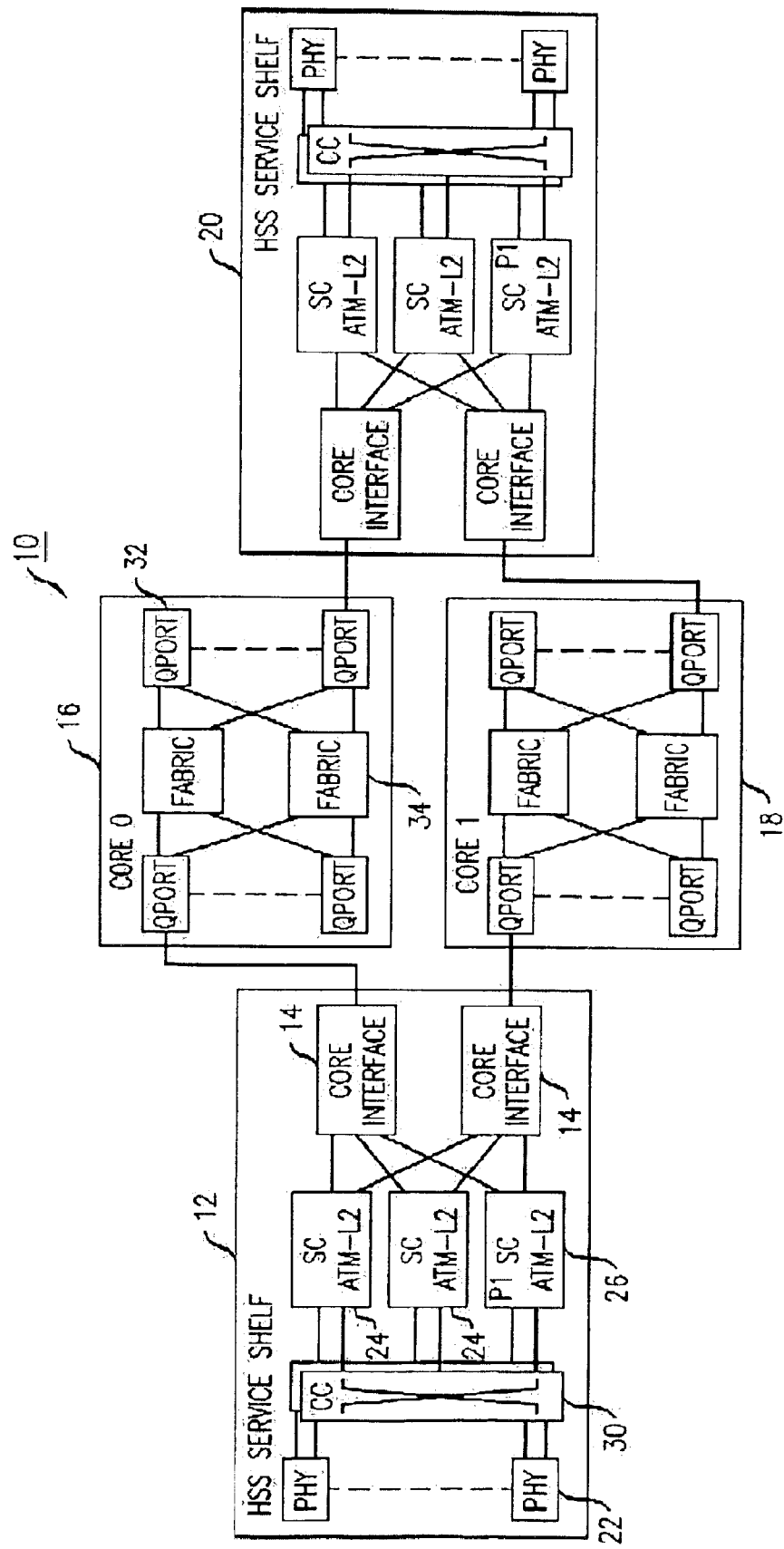
FIG. 1 is a high level diagram of a multiservice switch incorporating the core interface device of the present invention.

Referring to FIG. 1, there is shown one exemplary embodiment of a multiservice switch 10. The switch includes a service shelf 12 which incorporates a core interface module 14. As would be understood, the functional blocks illustrated in the figure may take the form of one or more cards or modules that are insertable into a rack or other similar type system. The service shelf 12 couples to first and second redundant switching cores 16, 18. A second service shelf 20 couples to what can be considered the output side of the switching cores.

As shown, the general makeup of the service shelf 12 includes a physical layer interface card 22 which is a user interface that can be an optical or electrical interface, e.g., DS3, OC-12, OC-48, OC-192, etc. In the case of the high speed shelf shown, the physical layer is generally a high density optical interface such as OC-48 or OC-192. The physical layer card 22 couples to higher level service cards 24, 26 (for example, layer 2 or layer 3 for ATM or IP) through a cross connect device, for example, a SONET STS-1 level cross-connect. The service cards 24 couple to the switching core through core interface modules 14. As shown, the switching cores 16, 18 are traditional switch cores including input/output ports 32 as well as switching fabrics 34.

The interface mechanism between the service cards 24 and the core 16, 18 provides redundancy protection between the service cards and core without the requirement that extra core bandwidth be allotted for the protection cards. As shown in the exemplary embodiment, two on-line ATM service cards 24 are protected by one back-up or protect service card 26. The core interface card 14 permits routing of core data to and from any of the three cards. In addition, the protection card 26 can be switched in place without the corresponding re-routing having to be known to the rest of the system.

The basic approach to fault detection is to assume that the two cores 16, 18 are not in lock step, but that the shelves 12, 20 are continually monitoring link flows for flow control data as well as user data. The flow monitoring is done largely in dedicated hardware and the status is passed up to a local processor within a service shelf 12, 20 in order that recovery can proceed quickly. As will be explained in greater detail, the flow monitoring is accomplished using a combination of arbiter and aggregator functions (shown in FIG. 2) found in the service shelves 12, 20 and core interface cards 14, respectively. The arbiter (ARB) transmits (on ingress) link test cells to both cores on a per flow basis, which are received and monitored at each arbiter on the egress side.

When an egress arbiter determines that a flow is bad, it initiates a switch to the alternative source core, from which the flow would continue. A unique aspect of the present invention is that no notification need be sent to the ingress source because there is no coupling from a switchover basis of duplex flows. The ARB performs steering on a per flow basis as to which traffic is to be accepted between core 0 and core 1. Control and link validation traffic can be accepted from either core in parallel. At all times, a full communications traffic load is transitioning both of the cores. There is no inherent primary and secondary core, however, except from the standpoint of which core a respective arbiter will accept data at startup under SW control. In all cases, data is transmitted through both cores. Note that in all cases, full core bandwidth is available to the shelves.

In some cases it will be advantageous to purposefully support switchover of flows from one path to the other without causing loss of data, this is termed a "controlled" or "hitless" switchover. For example, it may be required to upgrade or replace a card and it is desirous to do this without taking an "Errored Second" hit at the system level.

Given that the ARB is transmitting to both Cores simultaneously, it is required that the flows to both Cores be synchronized at the AGR0/1 level and the Egress ARB be given time to cease receiving packets from one Core, then switch over to the other Core, and continue receiving packets. The mechanism to support this is the indication of EOF, "End of Flow" and SOF "Start Of Flow" from the ARB to the AGR in a special test cell. Starting from the Ingress side the processor first determines a master AGR. The other AGR becomes a slave. The ARB in line with the traffic going to both AGRs inserts an EOF indication to the AGRs that causes the AGRs to both stop data flow of the specific VOQ selected. In order to synchronize the flows, the Slave AGR indicates to the master AGR when it has stopped traffic on a particular flow. When the Master AGR has also stopped traffic it indicates this to the Egress ARB via the EOF indicator that also tells the egress ARB which Core to switch to. Thus, when the Egress ARB has received an EOF from both AGRs it can switch over.

To restart data flow the AGR sends a SOF cell to the Egress ARB and traffic continues as usual. There is potentially a QOS (quality of service) hit but no loss of data to this mechanism. Thus, a controlled hitless switchover can be supported on a per connection/VOQ flow basis as well as on a per leaf basis of a Multi-cast group.

Figure 2:
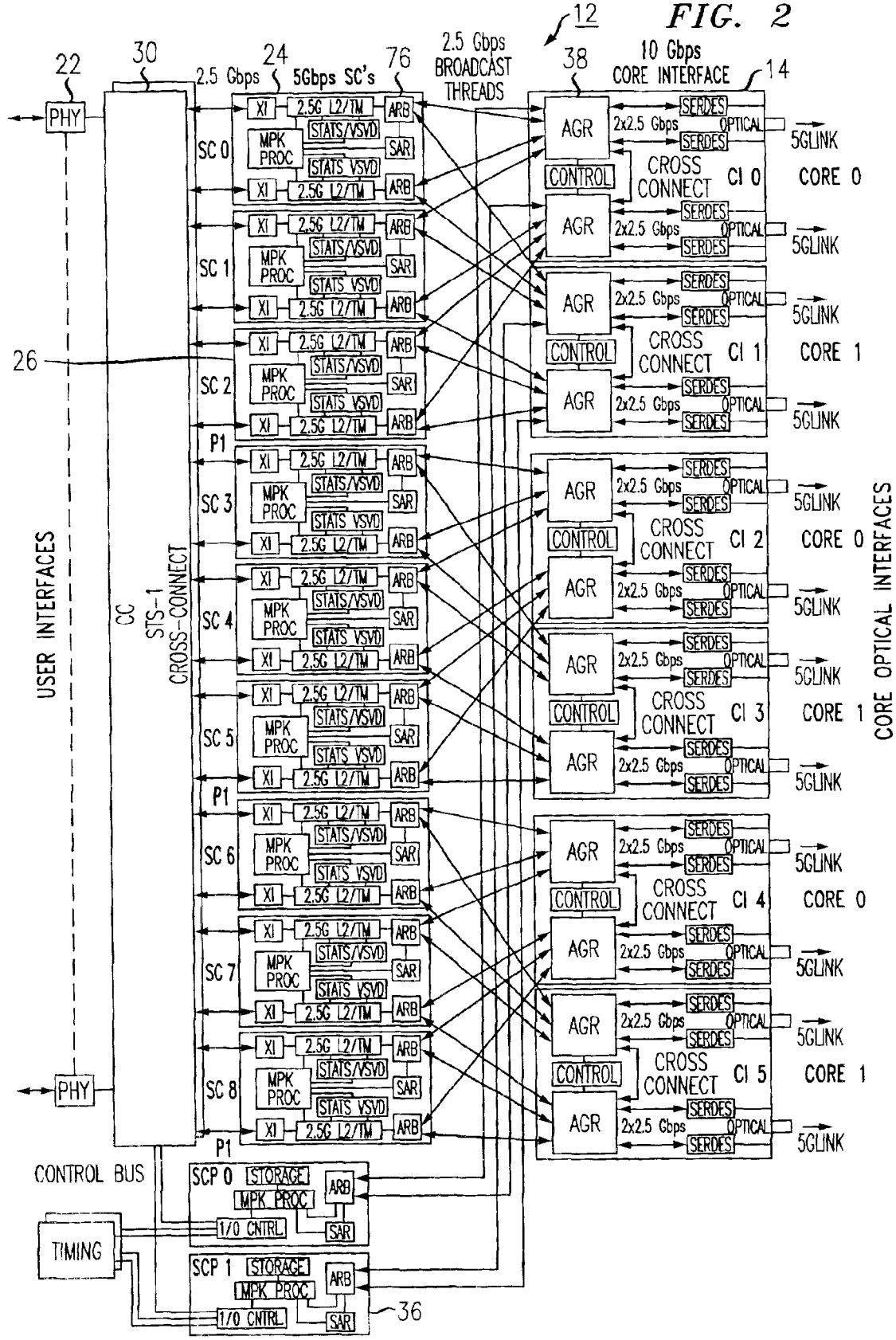
FIG. 2 is an exemplary block diagram of a high speed service shelf.

In order to more clearly understand the present invention, an exemplary structure of a multiservice switch will now be described. Referring to FIG. 2, a detailed block diagram of a service shelf 12 in accordance with the present invention is shown. FIG. 2 illustrates the interface between the service cards 24, 26 and the switching core via the core interface modules 14, where the specific interconnects between the service cards and the core interface are shown. In the exemplary embodiment, the service shelf 12 includes nine service cards (SC0–SC8) which couple, respectively, to six core interface cards (CI0–CI5). As in FIG. 1, two on-line service cards 24 and one protect service card 26 couple to the switching cores through each core interface card providing 1:2 redundancy. Also included in the service shelf are shelf control processor cards 36 which handle administrative processing functions for the shelf.

The core interface cards 14 couple to redundant switch cores 16, 18. A core interface card 14 monitors its link to the core and reports status to the shelf control processor 36 on the service shelf Referring to FIG. 3 in combination with FIG. 2, an exemplary block diagram of a core interface card 14 is shown. As shown, service cards 24, 26 couple to the core through an aggregator device 38 in the core interface card 14. Interconnections between the aggregator in the core interface and the arbiter blocks on the service cards are illustrated with double arrows. (FIG. 2).

Figure 3:
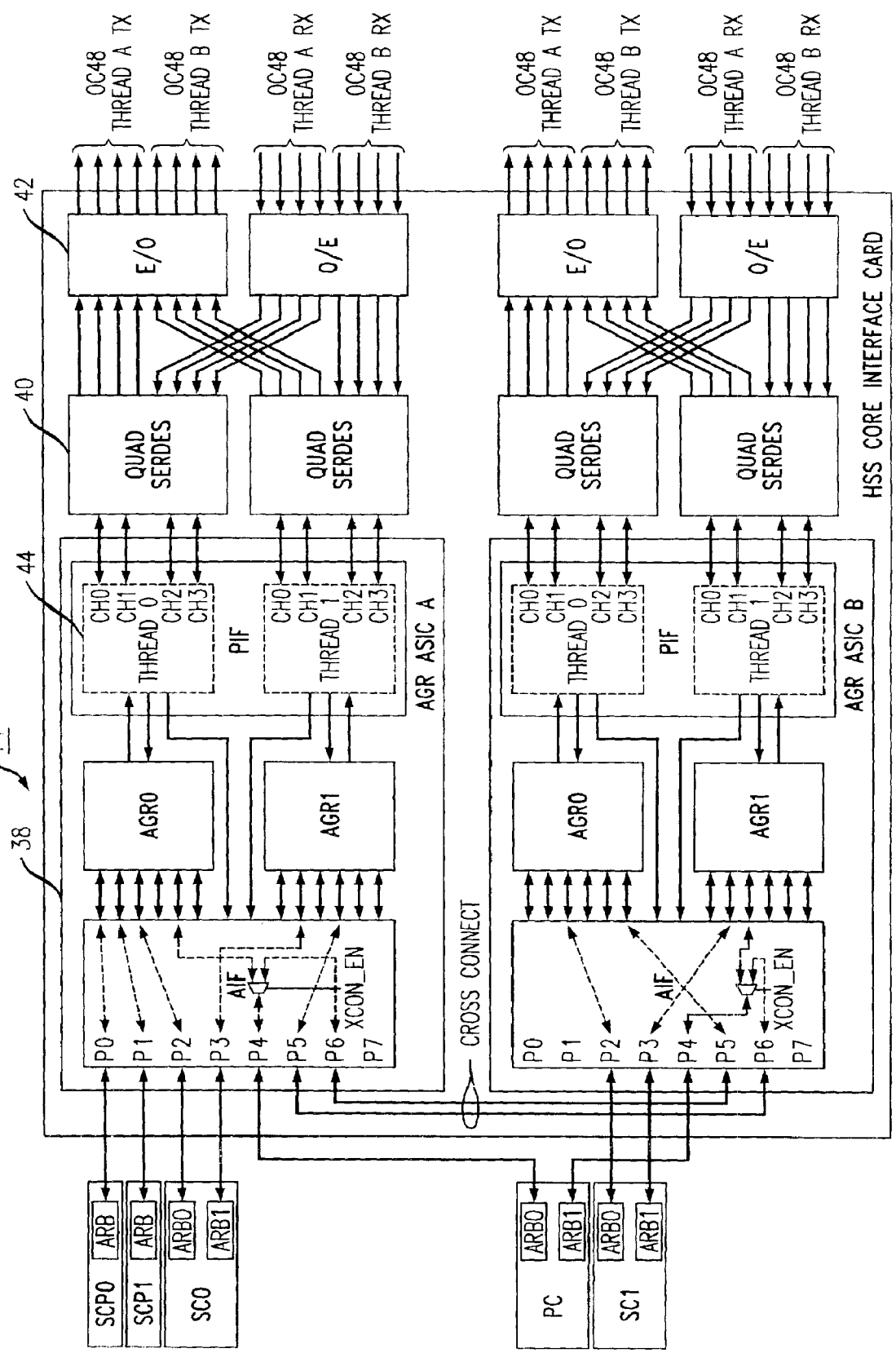
FIG. 3 is an exemplary block diagram of a core interface card for a high speed shelf.
Figure 6:
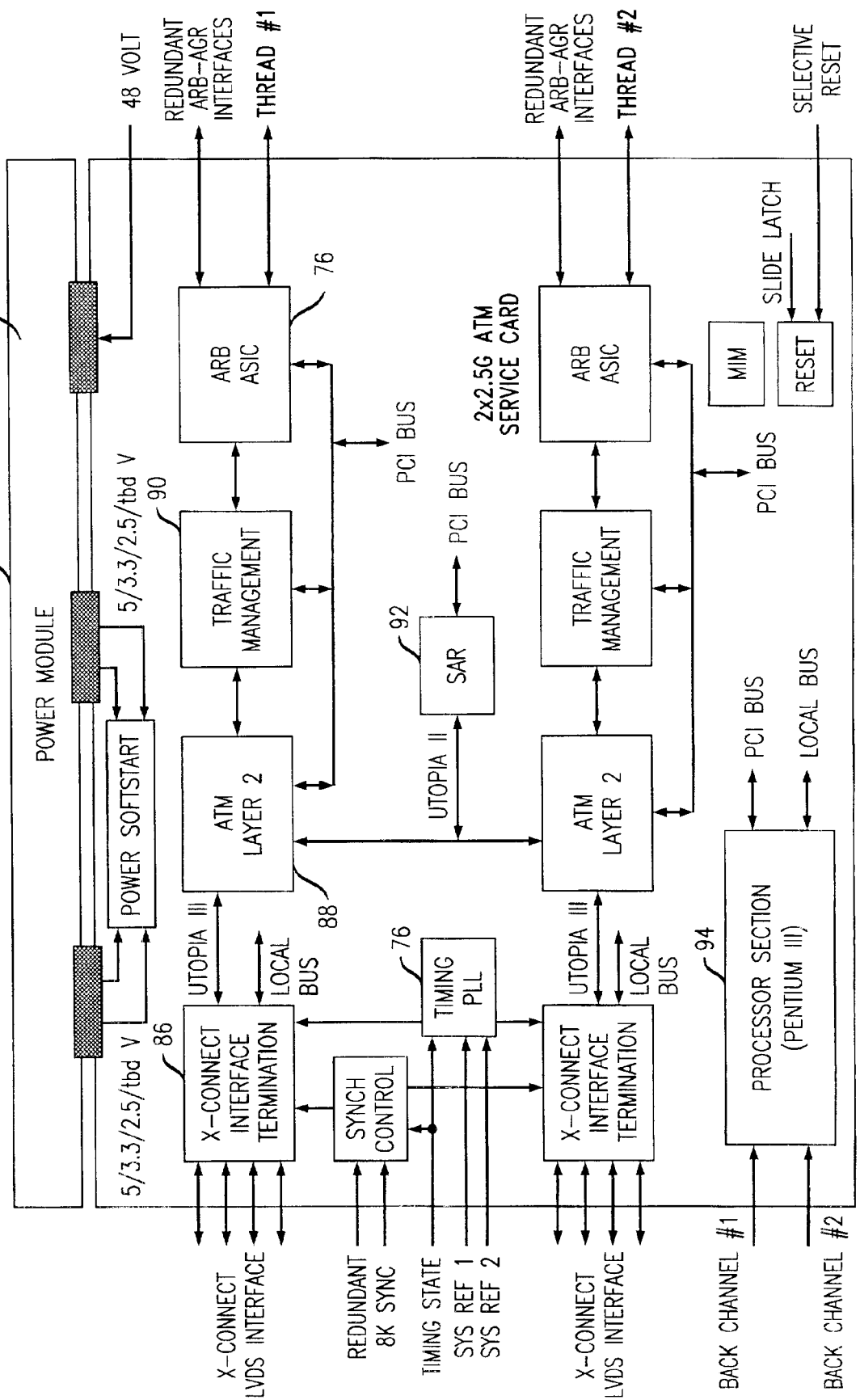
FIG. 6 is an exemplary embodiment of a higher level service card as used in connection with the present invention.

The aggregator device 38 acts as an interface between the service cards 12 and the switching core and essentially distributes core traffic throughout the service shelf. The aggregator 38 acts as a datapath flow switch, directing flows to either the normally active service card slot or to the dedicated protection slot. Note that neither core bandwidth, nor bandwidth of the service cards (shown in greater detail in FIG. 6) is wasted by the aggregator cross-connect function to the service cards (FIG. 6). In all cases, the aggregator 38 will allow control information connectivity through the core to all attached service cards 24, 26 and shelf control processors 36. Although shown and described as an applications specific integrated circuit (ASIC), it would be understood that the functionality of the aggregator 38 as described herein may also be implemented using discrete components. As shown in FIG. 2 and 3, the core side of the aggregator 38 couples to multiple serializer/deserializer blocks 40. The implementation and function of a serializer/deserializer would be well known to a person skilled in the art. The serializer/deserializers 40 couple to optical/electrical (O/E) components 42 in order to provide the interface to the switching core. Failure of a link will be detected by a serializer/deserializer 40 or the aggregator device 38 and reported to the shelf control processor 36 through a control interface on the aggregator. Failures may be detected, for example, by the loss of a clock signal corresponding to the link or an invalid parity across the link. Other types of failures that are detectable and that can be characterized as a link failure would be apparent to those skilled in the art. As will be explained, the shelf control processor 36 (in combination with the aggregator 38) trigger appropriate corrective action in response to a link failure. The aggregator 38 on the core interface card 14 also contains a thread switch function 44 for service card protection. The switch function 44 allows the core interface card 14 to steer traffic on a given thread to/from an active service card to a protection card. For the shelf, service card protection will be 1:2. The core interface card 14 (and the shelf control processor 36) will control the protection switching of the interface. In addition, as will be explained, an arbiter function on the service card can detect link failures on the basis, for example, of the receipt/non-receipt of link test cells.

Figure 4:
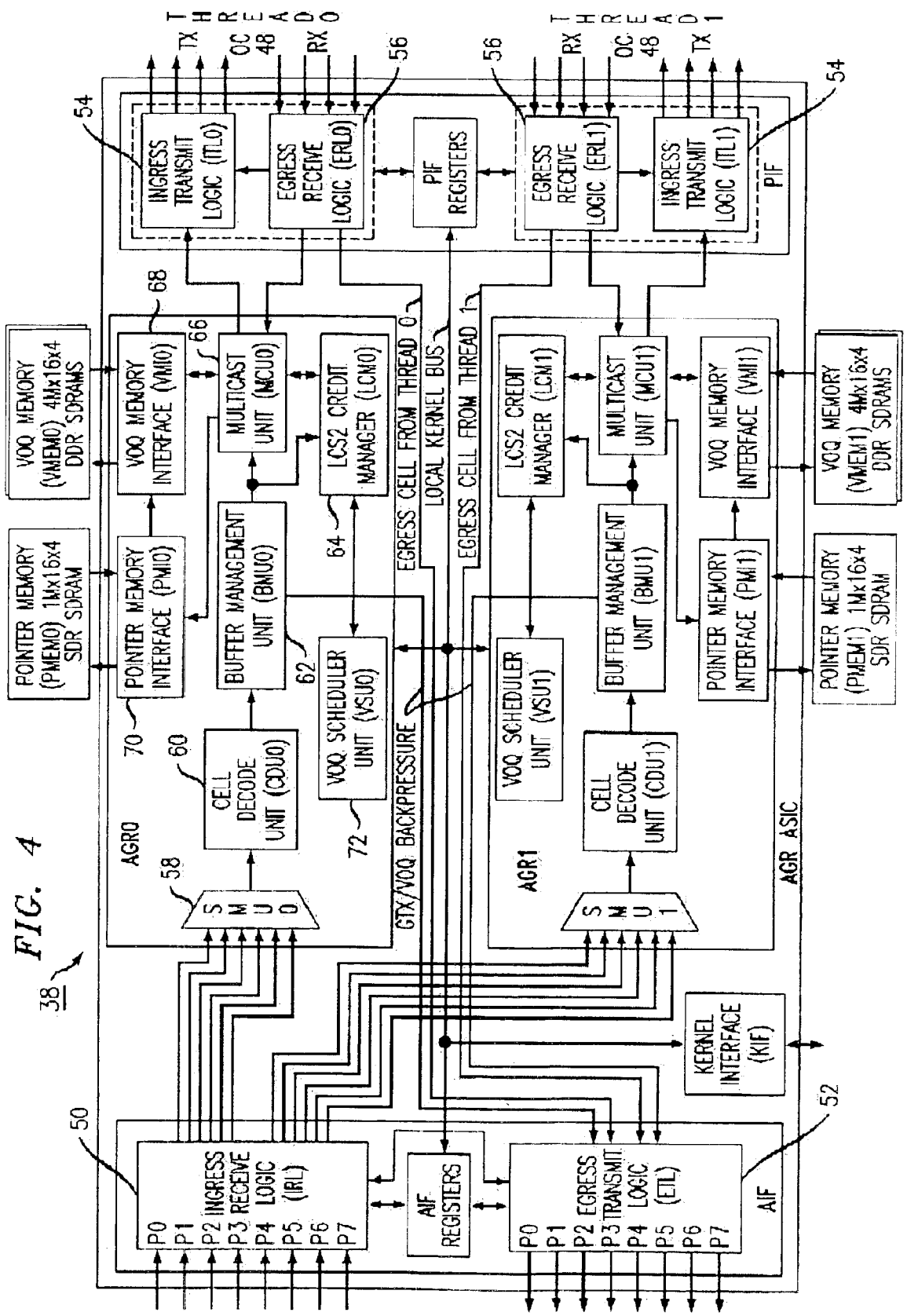
FIG. 4 is an exemplary block diagram of an aggregator function as used in connection with a multiservice switch.

FIG. 4 shows a functional block diagram of the aggregator device 38. The aggregator 38 includes ingress receive logic 50 and egress transmit logic 52 on the service card side. Ingress transmit logic 54 and egress receive logic 56 are also found on the core side of the aggregator 38. There are two aggregation functions—AGR0 and AGR1—implemented in the aggregator (AGR) ASIC, each performing an aggregation of up to 6 independent data streams into, for example, a 2.5 Gbps or higher thread. These two aggregation functions are independent and the operation of one does not affect any state of the other. In one exemplary embodiment, each aggregator function AGR0, AGR1 includes a multiplexer unit 58 which couples to the ingress receive logic 50, a cell decode unit 60 which couples to the output of the multiplexer 58 and a buffer management unit 62 which couples to the output of the cell decode unit 60. A credit/grant manager function 64 and a multicast unit 66 each couple to the output of the buffer management unit 62. A virtual output queue (VOQ) memory interface 68 and a pointer memory interface 70 each couple to the multicast unit 66. A VOQ scheduler 72 couples to the credit/grant manager 64.

The AGR ASIC communicates with the service shelf cards through an arbiter (ARB) ASIC 76 over an 8-bit LVDS (low voltage differential signal) interface (FIG. 2), for example. As shown, the AGR ASIC has 8 ARB interface (AIF) ports. Four of these AIF ports can be configured to connect to either of the aggregation functions in the AGR ASIC. Of the remaining four AIF ports (P0–P7), two are connected to aggregation function 0 (AGR0) and the other two are connected to aggregation function 1 (AGR1). Thus, a maximum of six AIF ports can be connected to each aggregation function. In the ingress direction, each aggregation function statistically multiplexes a combination (maximum of 6 data streams) of OC-12, 2×OC-12, and OC-48c data streams into a 2.5 Gbps stream. In the egress direction, each aggregation function broadcasts an OC-48 thread coming from the core to the six (6) ARB ASICS connected to that thread. Note that the internal cross-connect function of the AGR conserves core bandwidth and supports 1:N service card redundancy without wasting core bandwidth.

As discussed above, the AGR ASIC communicates with the switch core, for example, on OC-48 links through quad serializer/deserializer (Serdes) 40 and Optical/Electrical ports 42. The Serdes transmitter 40 serializes and encodes the data, e.g. 8B10B data, for proper transmission over the fiber link. The receiver will deserialize, decode and also synchronize the four channels (channel lock) before transmitting the data to the aggregator (AGR) ASIC 38. Optical/Electrical components take the electrical signals produced by the Serdes and convert them to optical signals for fiber link transmission and take optical signals from the link and convert them to electrical signals for Serdes processing. In one embodiment of the invention, for example, a 96-byte data cell is striped among four channels. This data cell includes the 84-byte packet and 12-bytes of control data. Data is transferred between the aggregator ASIC and each Serdes on a 4×8-bit unidirectional bus. This cell is transmitted, for example, in twenty-four 155.52 MHz-clock cycles.

The AGR ASIC 38 is used in high speed and low speed applications, where the respective service shelves are accordingly termed high speed service shelves (HSS) and low speed service shelves (LSS). In the HSS and LSS applications, the AGR 38 resides in the HSS and LSS core interface cards, respectively. In the exemplary embodiment of the high speed shelf 12, the core interface card in the HSS uses two AGR ASICS 38 and provides a 10 Gbps (4×2.5 Gbps) interface to the switch core. In the exemplary embodiment of the low speed shelf (see FIG. 5), the core interface card 80 in the LSS uses one AGR ASIC 38 and provides a 5 Gbps (2×2.5 Gbps) interface to the switch core. The AGR is software configurable based on the specific application.

In the exemplary embodiment, the AGR ASIC includes 8 AGR-ARB interfaces each with a data rate of OC-48. All of the eight AGR-ARB interfaces (AIF ports P0 through P7) are software configurable to operate the AGR ASIC in different configurations required for different shelves (e.g. the High-Speed Shelf and Low-Speed Shelf). Setting a corresponding port enable bit in AIF Port Control Register 0 & 1 can activate each interface. AIF ports P0 & P1 are connected to the aggregation function 0 (AGR0) and ports P6 & P7 are connected to aggregation function 1 (AGR1). Ports P2 through P5 can be connected to either aggregation functions (AGR0 or AGR1), depending upon the A GRn__ SEL bit in the AIF Port Configuration Register. Therefore, at any time at most 6 AIF ports can connect to one OC-48 thread.

In the high-speed shelf, the core interface card 14 has two AGR ASICs 38 (AGR-A and AGR-B) residing on it and provides an aggregate bandwidth of 10 Gbps to the core. Each AGR ASIC 38 is connected to one 5 Gbps high-speed service card and to one of the two 2.5 G ARB interfaces on the protection card. One of the two AGR ASICs will also have a shelf control processor (SCP) card(s) connected to it.

Figure 5:
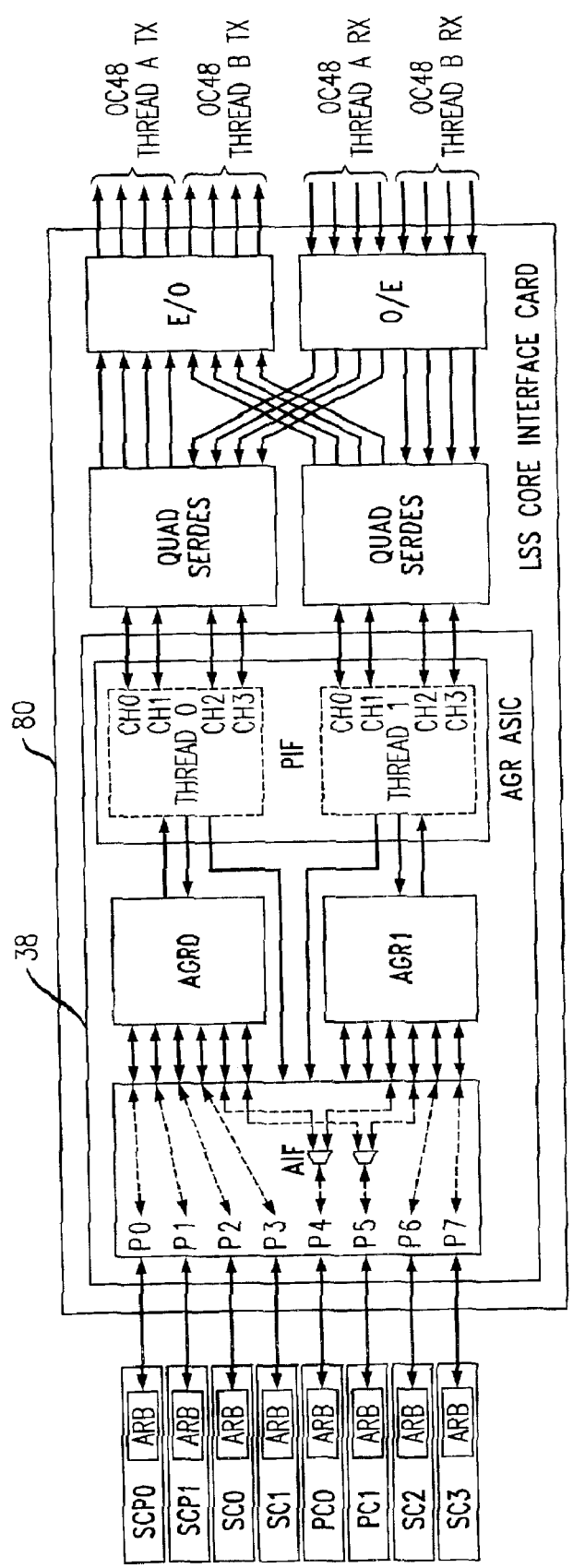
FIG. 5 is an exemplary embodiment of a core interface card for a low speed shelf.

In the low-speed shelf (FIG. 5), the core interface card 80 has one AGR ASIC 38 and provides two 2.5 Gbps aggregated threads to the core, The AGR ASIC interfaces with the ARB ASIC in 4 low-speed service cards, 2 protection cards, and 2 shelf control processor (SCP) cards. All low-speed cards have an average data rate of 2×OC-12, however, in burst traffic conditions, the interfaces can support a peak data rate of OC-48. FIG. 5 shows AGR in LSS core interface card.

Referring again to FIGS. 1 and 2, it can be seen that the service cards 24, 26 will receive flows from the redundant cores through the core interface card 14. An arbiter function (ARB) 76 in the service cards 24, 26 will monitor the end to end path of the flows through special in-band test messages (termed link test cells) over both cores. If a flow is failed, the destination ARB will automatically switch and accept traffic through the protection path from the redundant core and core interface card. The source ARB will always broadcast traffic and test messages through both cores. The AGR interfaces with an Arbiter device/circuit that resides on all service cards and shelf control processors 36 to complete the core interface. From a high level the ARB 76 is intended to merge traffic flows from each core as necessary, on a per flow basis, and act as a header translator and filter for traffic flows from the cores. The ARB and AGR will also provide flow checking and fault detection checking. A significant advantage is the ability to switch individual flows without impacting other flows within the switching system and to not waste core bandwidth with 1:N service card protection.

Referring to FIG. 6, one exemplary embodiment of a high level service card 12 is shown. As illustrated, the service card is an ATM service card, although it would be understood that other types of service cards can be utilized, for example IP, frame relay, and TDM. The service card shown provides 2×2.5 Gbps threads and provides the ATM layer and traffic management functions for the service shelf As shown, cross connect interface terminations 86 couple to the ATM (layer 2) processing blocks 88. The ATM blocks 88 couple to respective traffic management functional blocks 90 as well as to the ARB ASIC 76 providing the two threads. The ATM layer blocks 88 also couple to a segmentation and reassembly function (SAR) 92 that couples to a local processor 94 via a PCI bus. The service card also includes timing and power functions 98.

The Arbiter ASIC, or ARB ASIC 76, will be used in the switching system as a flow control mechanism for cell traffic as well as a test cell generator and receiver for system level flow verification. As with the aggregator device, although the exemplary embodiment is described with respect to an ASIC, it would be understood that such a device may also be implemented using discrete components. The ARB is utilized, for example, in the high speed shelf, the low speed shelf, and interfaces on one side to a physical layer device such as a scheduler, also known as a traffic manager or TM. On the opposite side, the ARB interfaces to the aggregator (AGR). The ARB ASIC includes a UTOPIA II bus for interfacing with a SAR for processor to processor communication. The ARB also supports an external memory interface for GMID (global multicast ID) to ECID (egress circuit ID) translation. The ARB ASIC contains a test cell generator and a test cell receiver to test online and off-line cell flows through the core via CRC checks.

The ARB resides on a service card and forwards user traffic (from the physical interface) to the core interface cards at an OC48 (2.5 Gbps) rate. The ARB receives traffic from the core interfaces and will forward traffic destined to its TM device. An ARB also resides on the shelf control processor (SCP). In the SCP application, the ARB interfaces to a SAR device to enable processor to processor communication and will not interface to a TM device.

Figure 7:
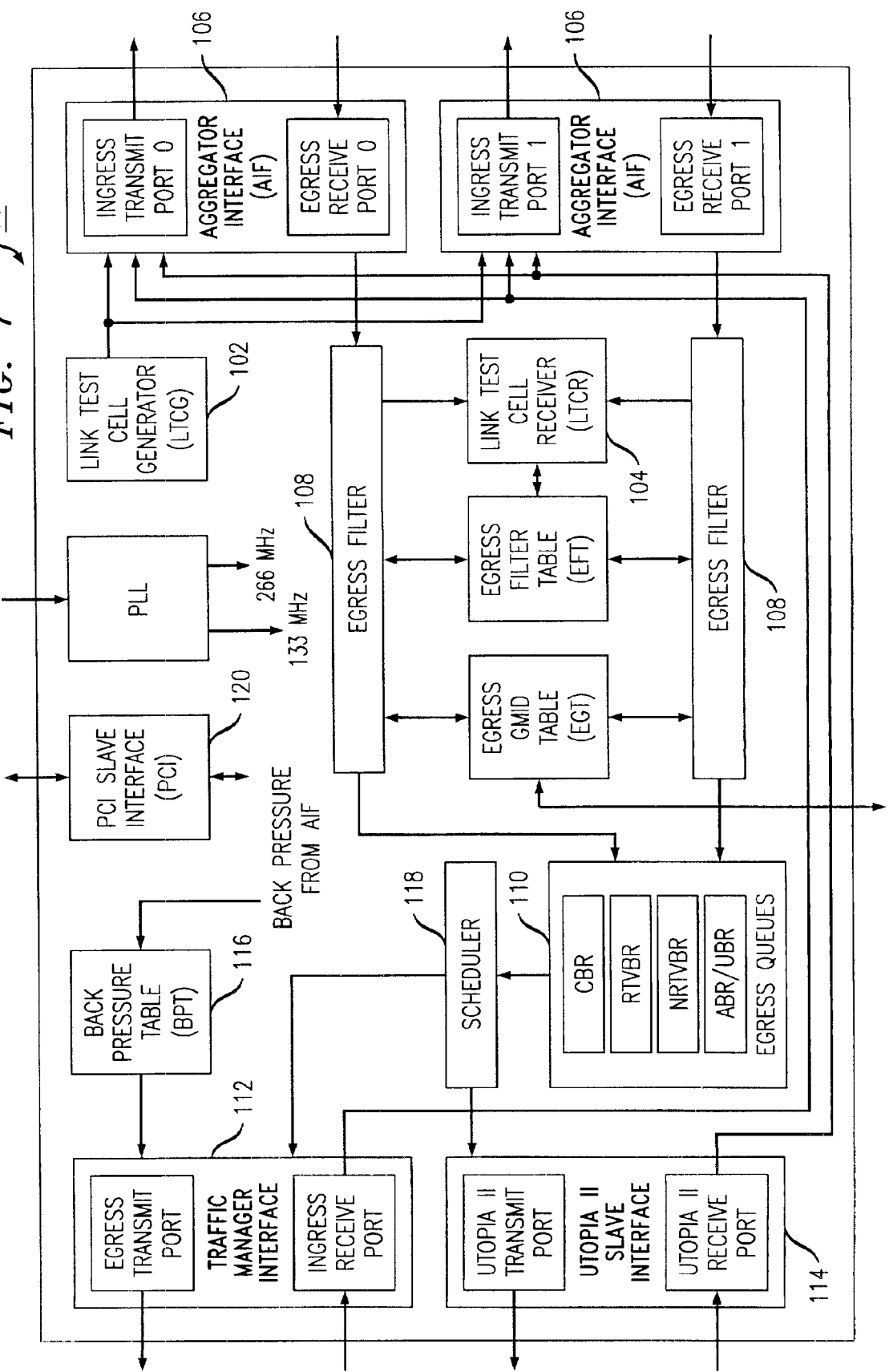
FIG. 7 is an exemplary block diagram of an arbiter function as used in connection with a multiservice switch.

Referring to FIG. 7, a functional block diagram of the ARB ASIC 76 is shown. The exemplary embodiment of the ARB includes six interfaces: a PCI (processor interface) interface, a physical layer interface (PI Sched RX and TX), a SAR interface (RX and TX), two AGR interfaces (RX and TX, one per core) and an external memory interface. As discussed previously, the ARB includes a link test cell generator 102 and a link test cell receiver 104 which will be used in the system to verify flow integrity. The link test cell (LTC) generator 102 and receiver 104 couple to the aggregator interface 106, the link test cell receiver 104 coupling through respective egress filters 108. The ARB also includes internal priority queues (four QOS levels) 110 for egress traffic, the inputs of which couple to the egress filter 108. The priority queues couple to egress transmit ports (TM and Utopia) 112, 114 through a scheduler 116 or 118. The egress filters 108 in the ARB provide a filtering function that is used to determine if the ARB should accept unicast and multicast cells from the AGRs.

From an ingress standpoint (with relation to the core), if the ARB 76 is in TM mode, user cells will enter through the physical layer interface TM. BIP8 calculations (bit interleaved parity across 8 bit boundaries) will be checked on a per cell basis and optionally drop BIP8 erred cells. Cells entering the ARB through the physical layer interface will be broadcast to both AGR ports (and sent to both cores). Internally generated link test cells will be combined with the user traffic in the ARB ASIC and sent to both AGR ports. The link test cell generator 102 can optionally back pressure the TM device using a back pressure table 116 to create space for test cell insertion. If no user cells or test cells exist, idle cells will be inserted to sustain the flow.

From an egress standpoint, cells will enter the ARB via one of two AGR interfaces. When a cell first enters the ARB, a check will be done to determine if the cell is a test cell, a unicast cell, a multicast cell, or an idle cell. Filters and checks will be done to forward the cell to the appropriate interface (TM/SAR or LTC receiver). BIP8 calculations will be checked on a per cell basis and optionally drop BIP8 erred cells. Cells destined for the TM/SAR are placed in one of four priority queues 110 based on a QOS field in the cell. Cells from both AGR interfaces are placed into the same queues. Cells will be read from the priority queues based on either a fixed priority or a programmable priority depending on scheduler mode and sent to the TM or SAR based on mode.

As discussed, support for 1:N service card redundancy is provided in the AGR 38. In the described embodiments of the HSS and the LSS one protection card (a hot standby) is provided for every two service cards. In order to provide the redundancy protection and allow for seamless traffic switchover between the protection card and service card and to provide per flow protection switching, an address mapping scheme, termed a Z-mapping scheme (after the different address fields) is implemented.

All the ARB ASICS 76 in a switch utilizing the present invention interface are uniquely identified from a flow/connection standpoint based on an X.Y.Z addressing scheme. The X portion of the address represents an 8-bit OC192 port ID used for addressing one of 256 fabric output ports. A 2-bit Y field addresses the four OC 48 ports within an OC 192 port addressed by X. That is, Y specifies one of the four OC48 links between the switching core and a core interface card. A 3-bit bit Z field addresses an ARB ASIC or AIF port associated with an OC48 thread (PIF thread). The X.Y.Z value is stored in the packet header and is used by the switch fabric in the core and the line card on the service shelf to route packets to the correct destination card/port. It would be understood that the addressing scheme and addressing fields of the exemplary embodiment can be modified (e.g., expanded or contracted) depending on their application.

On the egress side, all user data cells and test cells received from the core are broadcast to all ARBS associated with an OC48 PIF thread. These cells contain a 3-bit E_Z (egress) field that identifies one of 8 destination ARBs connected to the AGR. Each ARB also has a unique Z ID stored in its Z[2:0] register. Upon receiving a cell from the AGR, the ARB compares the E_Z[2:0] field of the incoming cell with its Z ID. If the Z values match, the cell is processed, otherwise the cell is dropped.

When a service card fails, the associated egress traffic is switched to a protection card. In order to accomplish the switching, the AGR uses a 3-bit wide, eight entry deep Z-mapping table with each entry associated with one of the eight AIF ports. Each entry in the Z-mapping table contains the current mapped/unmapped Z address of the corresponding AIF port. The egress transmit logic in the AGR receives a cell from the egress receive logic, it looks up the Z mapping table used to overwrite the E_Z field of the outgoing egress cell. During normal operation, each entry in this table contains the Z address of the ARB connected to the associated AIF port. When one of the service cards fails, the Z address of the failed card and the protection card are swapped by the associated software. The Z address of the failed service card is now mapped to the Z address of the protection card and vice versa. Consequently, the egress traffic destined for the failed service card will now be accepted by the protection card.

It is desirable to have the Z-mapping table lookup disabled for test cells. For example, when a service card is being protected, it must still be able to receive test cells destined to it. Thus, test cells destined for the failed service card must not be mapped whereas user data cells destined for the same card must be mapped. The IGNR_Z bit in the egress cell header is therefore provided to override the Z-mapping lookup table. Hence, the Z-mapping table lookup will only be performed when the IGNR_Z bit is set to 0.

Test Flow Verification of Flow Paths

A flow of test cells is used to verify link integrity of each unique data flow path within a multiservice switch. Every ARB to ARB path over either switching core is used as a link. The ARB's are uniquely identified from a flow/connection standpoint based on their system level address, e.g., a "X(OC-192).Y(OC-48).Z(SCP/SAR)" location. Accordingly, the ARB configuration is different for each shelf type in the multiservice switch.

Figure 8:
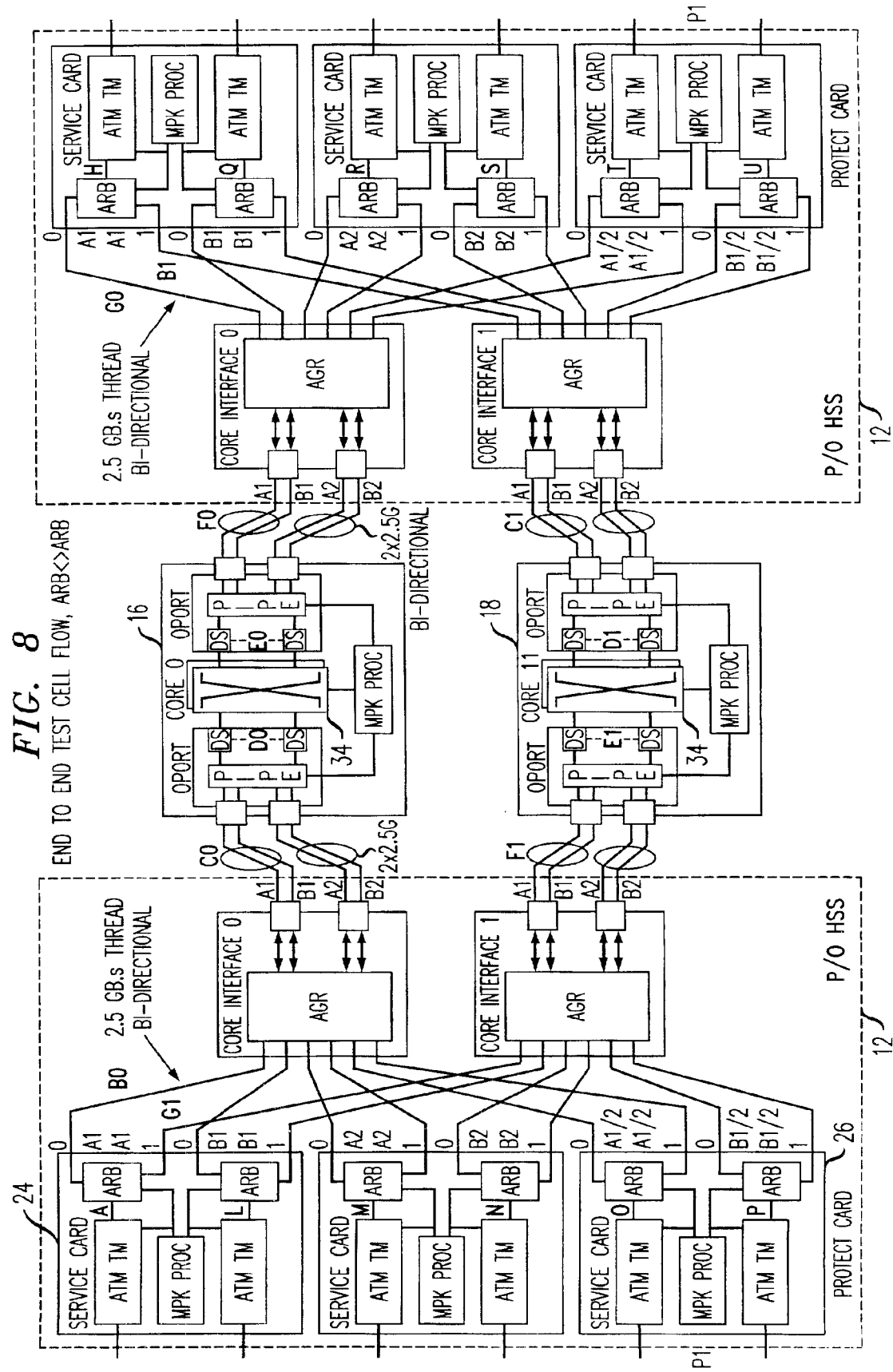
FIG. 8 illustrates an exemplary end-to-end test flow between arbiter devices in a multiservice switch.

With reference to FIG. 8, it is illustrated that each ARB to ARB path is treated as an end to end protection path. A flow path selection decision through a respective core is made based on this end-to-end flow with no information required for the service shelf to core path. In this regard, it is much like assuming the service shelf 12 to core 16, 18 link is akin to a section terminating in a SONET system. An ARB to ARB link failure can be on a service card 24 whereupon a service shelf processor (not shown) would have to effect a service card 24 to protect service card 26 switchover to restore service. For the most part, however, the ARBs typically remain operational and the failures exist outside the service card. Such failures may occur, for example, as part of the core interface card, core link or some portion of the core itself.

The overall approach to on-line fault detection and restoration assumes that the switching cores are NOT in lock step. A goal that is achieved by the present invention is to isolate link/flow failures and restore services to those flows without impacting other traffic in the system thereby increasing overall availability. The approach is end-to-end flow verification, (note that a flow is defined as a path from any ARB to ARB within the system without delineation to a per VC level). For on-line verification this occurs for both Cores. The number of flow paths is based on the total number of 2.5 G threads for the 2 Tbs system as well as the additional protection ports that will have ARBs. That is, each ARB needs to be able to verify the path to all other active ARB/s as well as the protection paths.

FIG. 8 shows the end to end flow path from ARB to ARB for an HSS type application in accordance with the present invention. Traffic from ingress to egress will travel over both cores, CORE0 and CORE1. Thus, the communications traffic for flows originating through ARB:A are passing over the path A>B0>C0>F0>G0>H to ARB:H. By the same token, traffic also flows from ARB A through the alternative core over the path A>G1>F1>C1>B1>H to ARB:H. Note that the connections are bi-directional in nature such that at the same time traffic from ARB:H is passing through CORE0 from G0 to F0 and terminating in ARB:A and ARB:L>P (one or more of ARB:L through P depending on whether any of the flows are multicast) as appropriate. However, from a redundancy standpoint, the bi-directional paths are not logically connected.

Within the internal header of each cell in a flow path, there will be a CT (1:0), Cell Type, field indicating to the various monitoring/routing functions that a cell is a test cell. The Test Cell will be part of the highest priority service across the multiservice switch. The Link Test Cell will incorporate the source X.Y.Z. address with CRC protection such that the receiving ARB knows the path through the switch.

Under the control of the local processor on the service card the ARB is directed, on a per flow basis, to pass CORE0/CORE1 flows to the TM function as a function of the integrity of the links. The integrity of these flows is ascertained via the test cells that flow over each active link. For example, assume that path F0 is down. In this case, ARB:A will accept traffic from ARB:H and ARB:Q over path C1, CORE 1, while flows from ARB:RS would continue to flow over CORE 0.

In all cases the ARB is generating and detecting for the presence of link flow failures on both the on-line paths, through CORE 0, as well as the paths through CORE 1. In this way the ARB uses the test cell integrity as verification of the overall end to end path through CORE 0 and CORE 1 and selects the appropriate path locally. No high level coordination is required. When an ARB detects a failure and takes action, it signals its action to the local processor on the service card. Actual switchover can be either HW initiated or exclusively via SW. In this way switchover can be coordinated locally by the processor on the service cards. This is similar to how failures are detected and switchover is coordinated at a network level.

In terms of an on-line test flow, each ARB has two internal tables. Referring to FIGS. 9 and 10, a first table 200 is for the test cells to be generated and the other table 210 (FIG. 10) is for the expected test cells from other ARBs. These are set up by the node level processor as paths to verify for coordination at the NODE level as flows are brought up at the switch level. The ARB monitors for proper NODE level operation with minimal SW interaction. More specifically, the ARB sends out test cells at a rate programmed by the service card processor. Only the ARB actually generates or terminates on-line test cells. Referring to FIG. 8, it can be seen that the test cells from ARB:A flow from the service card to the core interface card and are monitored by the AGR for service card to core interface (SC<>CI) link integrity.

This would be via use of a BIP8 check, for example, as part of the internal cell payload. Errors over this link are noted to the shelf control processor for making the service card, 1:N, protection switchover. Note that the AGR when monitoring test cells does not have to monitor uniquely each end to end flow, but just that test cells are being received properly from the ARBs that it is connected to, thereby minimizing complexity. In fact, an AGR does not differentiate between user traffic, which also has a cell parity check and test cells. The AGR provides information to the shelf control processor as to the ARB to AGR link. The AGR only has to have the capability to monitor for Link Test Cell or ARB/Processor generated test cells to verify link integrity. The same is true for the core switching fabric 34. This removes the need to have test cell injection at the AGR/core switching fabric level. However, as will be explained, the AGR/ARB must be able to capture unique test cells that are launched from ARB's.

It should be noted that test cells are neither generated nor received uniquely from port protection cards that are "off-line". Test cells, and VC control cells, are intended to follow the AGR switchover, re-mapping, when port switchover occurs thus making this transparent to the rest of the system. The test cells from ARB:A (FIG. 8) are passed through the AGR as noted and sent to the CORE. The on-line core input/output mechanism, termed a PIPELINER passes test cells through from the CORE unchanged but monitors for cell integrity via a local link check from AGR to PIPELINER and makes this available to a respective core control processor. The on-line PIPELINER does not specifically "look into" the test cells or user data cells but provides overall link operation information to the core control processor.

From an egress standpoint as shown in FIG. 8, cells passing out of CORE 0 are received by the AGR and again monitored for integrity and passed on to the ARB. Again, the AGR has the capability to monitor test cells to support off-line fault isolation. Test cells received by the AGR are routed to the appropriate ARB based on the X.Y.Z. routing information. The ARB receives test cells from the on-line ARB's and uses this information to fill in the flow table as to link integrity. Should the ARB fail to receive flow integrity test cells from a specific flow after a programmed soak period, it will generate an interrupt to the local processor for restoration of service. Note that flow integrity is verified largely in hardware and switched end to end by the service card/shelf control processors largely independently of the overall node control processor. Thus, switchover times can be minimized. However, as part of the switchover decision, a shelf control processor also has to ascertain the status of the CI and SC cards to determine if it should switch in the SC protect card. In all cases a service card processor or node control processor can override a local decision as may be appropriate.

When an ARB switches a particular flow from one CORE to the other CORE it does not differentiate between core interface failures or CORE type failures, but just end to end flows to re-establish service. The details are done off-line. An ARB "accepts" flows on a per link basis from CORE0 to the CORE1 without impacting flows over intact links in any manner based on test cells over the NODE level "network". Accordingly, ARB:A may be sending and receiving from both COREs simultaneously and combining them into one flow at point A to the ATM-TM function. Because the CORES are not synchronized this creates the problem that two 2.5 G flows, one from CORE0 and the other from CORE1, converge on a single ARB port to the TM device.

A feature of the multiservice switch present on the CORE egress side is that a QOS based back-pressure from the service shelf can operate to push congestion in the ARB first back to the AGR and then to the CORE on a per 2.5 G thread basis. The service shelf can stop cell flow or create "holes" by sending a bit that enables or disables cell flow on a time slot for each QOS level in the cell from the service shelf to the CORE. In this way, the ARB can reduce the overall combined flows below 2.5 GB/s, for example, to the TM function. This also prevents cell dropping at the AGR. Short term buffering, because of the latency in the Core from the time that a "Hole Request" is sent to the Core and a "hole" appears at the egress AGR, is required.

An important point with respect to the per flow fault detection and restoration is that the on-line fault detection and restoration is distributed and requires no interaction with the "higher level" shelf control processor or node control processor under most conditions. The detection and restoration process is handled on a service card basis with the local processor having the information available from hardware to make a timely decision. An exception is if switching to the service shelf port protect card is required, which would then require a shelf control processor function. On-line fault monitoring is largely HW based with fault indication elevated to the local processor for corrective action. Subsequent to the corrective action, implemented for example by way of software, the service will stay on the Core selected by the ARB until action is taken by an operator or other triggering event to return service to CORE0.

After the failed cards have been replaced and verified as being operational, then service, under operator direction, can be returned to the original CORE/Path. Service will not be switched back automatically.

Briefly summarizing the present invention, it can be seen that within the multiservice switch, ARBs generate and monitor test cells to determine link integrity for both core interfaces. The link test cell generator will contain a table with information as to which link test cells should be transmitted. The link test cell generator sends test cells to destinations as specified in a destination table. Link test will be sent to each AGR (core) interface (if enabled). The test cell receiver will contain a table with information as to the status of each link and from which link it should receive test cells. Failure to receive a cell within a specified time for a programmable number of cycles will cause the link to be declared faulted. A processor interrupt will be generated if not masked and, if enabled, the ARB will automatically update the egress filter table to switch to the other core. Once a link is declared faulted, the test cell receiver will continue monitoring the link and declare the link good if test cells are received are again received on that link for a specified number of cycles. The link test cell generator will support a mode where it will send a special test cell (end checking test cell (ETC)) to all programmed destinations. ETCs instruct the receiver to disable further checking from this source.

Controlled Unicast and Multicast Hitless Switchover

With regard to a controlled switchover, an ARB broadcasts ingress traffic to both of its AGR transmit ports. This means that traffic flows across both cores to the destination ARB, arriving at both of the ARBs AGR receive ports. The ARB filters out traffic from one of these ports based on its Egress Filter Table. In order to switch between ports and not drop or replicate cells, the filter update and the traffic arrival must be coordinated. As mentioned, this is controlled by the AGR by inserting Special Test Cells (STC) into a VOQ. This insertion is coordinated across both AGR so that the special LTCs are inserted into the same place in each data stream.

The on-line AGR inserts an end of flow (EOF) STC in the appropriate VOQ while the off-line AGR inserts a start of flow (SOF) STC in the corresponding VOQ. Upon receiving the EOF STC, which the AGR will assure arrives at the ARB before the SOF, the ARB will update the Egress Filter Table on a Xs, Ys, QOS basis, to filter any further traffic from that Xs, Ys, QOS arriving at that port. Upon reception of the SOF, the ARB will update its Egress Filter Table on a Xs, Ys, QOS basis to pass any further traffic from that Xs, Ys, QOS arriving on that port. Status bits will be provided to track arrival of SOF and EOF per port and also indicated SOF/EOF order error. The ARB checks that the EOF arrives before the SOF from a particular source. Since the ARB checks for EOF/SOF pairs it can only support one switchover at a time. Since each ARB RX port has a 3 cell input FIFO, the AGR will need to provide at least 3 cell separation between SOF and EOF to ensure proper operation.

STCs exist for both unicast and multicast hitless switchover. In unicast switchover, the destination X, Y, Z directs the EOF/SOF to a specific ARB for switchover. However, in multicast, the EOF/SOF STCs will arrive at all the multicast leaves and the test cell format contains a field that can be used to select a particular Xd, Yd, Zd.

Test cells from all ingress ARBs must reach every egress ARB within a predetermined amount of time (to determine that there is no fault in that path). In order to guarantee this, test cells must be given high priority by the scheduling mechanism. As a result, test cells will be written into the CBR queues or VOQs belonging to QOS0. When an aggregation function receives a test cell destined for a particular output, it writes the test cell into the corresponding VOQ in the QOS0 class. Both the ingress and egress receive logic in the AGR ASIC can be programmed to monitor specific test cells. In accordance with the present invention, the controlled switchover is implemented on a per VOQ basis, where traffic from each VOQ in a online AGR is steered to an offline AGR in a controlled fashion.

In order for a VOQ to have a clean switchover, TM and ARBs connected to an AGR will have to wait for VOQs in the online and offline AGRs to drain all of their traffic before performing the switchover. To ensure that all traffic is drained, the EOF and SOF test cells are inserted into the VOQs of the online and offline AGR respectively. The EOF test cell marks the end of pre-switchover cells and the SOF test cell marks the beginning of the post-switchover cells in the egress ARBs.

As discussed. the task of inserting the EOF and SOF test cells is complicated by the fact that the AGRs in both the cores operate out of synchronization with one another. The ingress SMUs in these two AGRs do not operate in sync with each other since their IRL rate FIFOs are not in synchronization. Thus, the EOF and SOF test cells cannot be inserted until all of the in-transit cells are written into the VOQs in both AGRs. A switchover register is configured with a valid VOQ ID and EOF/SOF insert bit, then the AGR asserts VOQ backpressure and waits for all the cells in transit or in an IRL FIFO to drain. Once the FIFOs have drained, an EOF test cell is inserted by the online AGR and a SOF test cell by the offline AGR. The VOQ backpressure is de-asserted after a fixed amount of time.

When the egress ARB sees an EOF test cell from the online AGR, it no longer accepts cells from the online core for that VOQ. The ARB then waits for the SOF test cell from the offline core. When the SOF test cell is received, the egress ARB will accept cells from the offline AGR for that VOQ. Thus, switchover for that VOQ is complete when the egress ARB has received EOF and SOF test cells for that VOQ. In order for this mechanism to work, the egress ARB must always see the EOF test cell first followed by the SOF test cell. To ensure this, the SOF test cell in the offline AGR must not be scheduled until the EOF test cell has been dequeued from the online AGR.

When the online AGR receives a grant for the EOF test cell, it communicates the grant to the offline AGR. The offline AGR cannot schedule the SOF test cell until the online AGR communicates the grant of the EOF test cell. Thus, when the SOF test cell reaches the head of the VOQ in the offline AGR, it waits for the EOF grant signal for the online AGR to be asserted. When the EOF grant signal is asserted, a VOQ RDY bit for that VOQ is also asserted and the SOF test cell is now ready to be scheduled. When the SOF test cell reaches the egress ARB, the switchover is complete.

While a VOQ is waiting to be switched over, cell flow to that VOQ will be delayed at two places (TM device and AGR) First, traffic is queued up to the TM device until the AGRs insert the EOF and SOF test cells into the VOQ. The time taken for the AGR to insert the test cells is based o the maximum time required to drain the IRL rate FIFOs and in transit cells in both AGRs. The ingress buffering at the TM device will be able to handle the buffering during this time.

Once the back pressure is de-asserted, cells will then be queued in the AGR until the egress side ARB has received the EOF and SOF test cells from the cores. This time is based on the time it takes for both VOQs to drain (the VOQs corresponding to the configured VOQ ID in the online AGR and offline AGR). To ensure sufficient buffering, the maximum size of a given VOQ (regardless of the number of VOQs active) can be upper bounded using the AGR Control Register.

Figure 11:
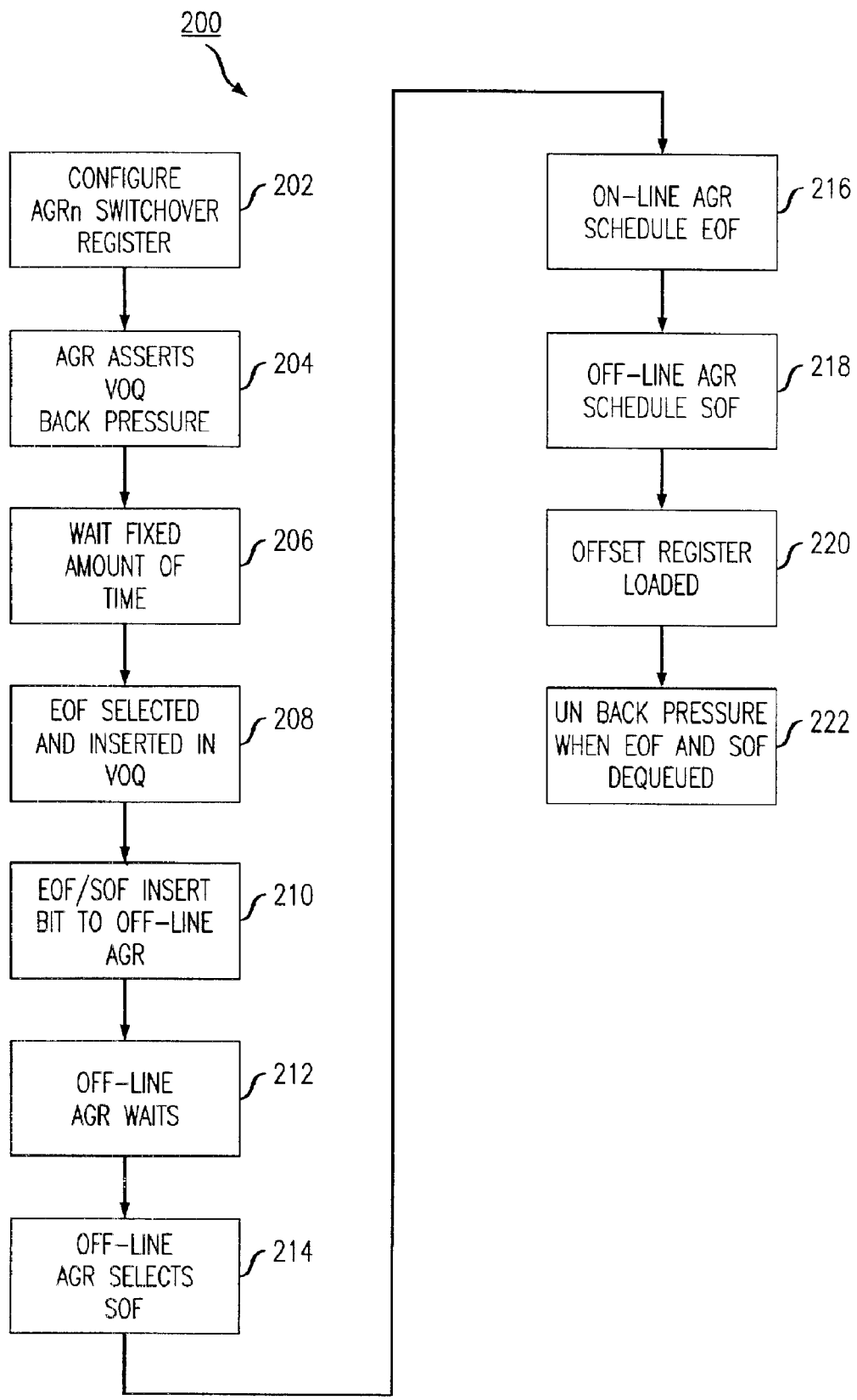
FIG. 11 shows an exemplary flow diagram for a controlled switchover in accordance with the present invention.

Referring to FIG. 11, an exemplary sequence of operations in accordance with the present invention is illustrated in flow diagram (200) with respect to a VOQ switchover:

1. As a first step (202), once it is determined that a VOQ switchover should take place, an AGRn Switchover Register in the online AGR ASIC is configured with the VOQ_ID and an EOF/SOF insert bit.
2. After the AGRn Switchover Register is configured, the corresponding aggregation function in the online AGR ASIC will assert a VOQ backpressure (204) (for the VOQ indexed by VOQ_ID). This backpressure is communicated to all ARBs connected, for example, to the corresponding OC-48 thread. To ensure that the VOQ Backpressure does not conflict with a "real" or standard VOQ backpressure (generated by the BMU after receiving a cell from the SMU (statistical multiplexing unit)) the SMU will be disabled during that cell time. As a result, the SMU will not pick a cell from the IRL rate FIFOs during the cell time in which the switchover backpressure is asserted.
3. The aggregation function in the online AGR ASIC waits a fixed amount of time (206) (determined by round trip latency between the AGR ASIC and TM device multiplied by the number of IRL rate FIFOs). This ensures that all the in-flight cells destined for that VOQ are drained from the IRL rate FIFOs. This amount of time is programmable through the AGRn Backpressure Latency Counter. When the timer expires, the SMU is forced to select an End of Flow (EOF) test cell (208) instead of a cell from the IRL rate FIFOs. This EOF test cell is then inserted into the VOQ indexed by the VOQ_ID in the AGRn Switchover Register.
4. Once the VOQ backpressure is asserted by the online AGR ASIC, the VOQ_ID and EOF/SOF test cell insert bit are communicated to the offline AGR (210) through a "switchover" interface that connects the online and offline AGRs. The offline AGR ASIC also waits a fixed amount of time (212) (programmed in the AGRn Backpressure Latency Counter) to ensure that all in-flight cells to that VOQ and cells from the IRL rate FIFOs are written into the VOQs. The SMUn in the off-line AGR ASIC is then forced to select the Start of Flow (SOF) test cell (214) instead of a cell from the IRL rate FIFOs. This mechanism is similar to the EOF test cell insertion. The system has to ensure that the VOQ backpressure remains asserted until the EOF and SOF test cells have been inserted.

5. The aggregation function in the online AGR ASIC schedules the EOF test cell (216) when the EOF test cell reaches the top of that VOQ. The EOF test cell is scheduled just like any other cell. When the grant for the EOF test cell comes back from the core, the EOF test cell is dequeued. This information is communicated to the offline AGR through the "switchover: interface.

6. The aggregation function in the offline AGR ASIC schedules the SOF test cell (218) only after the EOF test cell has been dequeued from the online aggregator. Since, only one VOQ can be switched over at a time, a single bit (EOF_Dequeued in the AGRn Switchover Register) gets set once the online AGR ASIC communicates that the EOF test cell has been dequeued. The Scheduler in the offline AGR ASIC must be able to detect that the SOF test cell is at the head of the VOQ. To implement this, an offset register (AGRn SOF Offset Counter) is loaded with the count of the number of cells in the VOQ during the enqueue of the SOF test cell (220). Every time a request is made from the VOQ that is being switched over, this counter is decremented. When this counter is zero, the SOF test cell is at the head of the request queue.

7. Un-backpressure information is broadcast to all ARBs when the EOF test cell and SOF test cells are dequeued or earlier (222), depending on the state of the VOQ during EOF test cell insertion. The AGR must ensure that un-backpressure information related to switchover does not conflict with un-backpressure information related to another VOQ.

An AGRn Switchover Register holds the control bits for the EOF and SOF test cell insertion—EOF/SOF bit and VOQ_ID. It also holds an EOF_Dequeue bit that gets set (in the offline AGR) when the online AGR has dequeued the EOF test cell. The AGRn Backpressure Latency Counter holds a timer value—the number of cell times from the configuration of the AGRn Switchover Register until the insertion of EOF test cell (EOF latency counter) or from configuration until insertion of SOF test cell (SOF latency counter). In one embodiment, the "switchover" interface between the two AGR ASICs will be a serial interface to limit the pin count.

The foregoing description merely illustrates the principles of the invention. It will thus be appreciated that those skilled in the art will be able to devise various arrangements, which, although not explicitly described or shown herein, embody the principles of the invention, and are included within its spirit and scope. Furthermore, all examples and conditional language recited are principally intended expressly to be only for instructive purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Many other modifications and applications of the principles of the invention will be apparent to those skilled in the art and are contemplated by the teachings herein. Accordingly, the scope of the invention is limited only by the claims appended hereto.

What is claimed is:

1. A method of performing a switchover of data flows in a multiservice packet based switch from a first data flow path to a second redundant data flow path without loss of data, said multiservice switch including redundant switching cores, said method comprising the steps of:

providing a plurality of ingress and egress communications traffic flow controllers, each of said flow controllers directing one or more threads of said communications traffic over one or another of said redundant switching cores;

monitoring communications flow paths traversing said ingress flow controller, one of said redundant switching cores and said egress flow controller;

in response to a need for switching at least a portion of said data flows to said redundant data flow path, causing an interruption of said at least a portion of said data flow by an ingress flow controller and signaling the occurrence of said interruption to an egress flow controller in a traffic thread from said ingress flow controller, wherein said interruption signaling further identifies a switchover of at least a portion of said data flows to a path including said another switching core;

waiting an interval after said interruption and thereafter causing said least a portion of said data flows to be restarted;

providing a signal from said ingress flow controller to said egress flow controller indicative of said data flow restart and directing a switchover by said egress flow controller to said another switching core path; and accepting said data flows from said path traversing said another switching core.

2. The method of claim 1, wherein one or more virtual output queues (VOQ) exist for a particular ingress flow controller and a particular egress flow controller, switching from said first data flow to said second redundant data flow being accomplished on a per VOQ basis.

3. The method of claim 2, wherein said step of monitoring data flows is accomplished using link test cells generated from a link test cell generator in said ingress flow controller to a link test cell receiver in said egress flow controller.

4. The method of claim 3, wherein said interruption signaling is given by an end-of-flow (EOF) test cell.

5. The method of claim 3, wherein said data flow restart signaling is given by a start-of-flow (SOF) test cell.

6. The method of claim 1, wherein the step of accepting includes the step of altering a filter table in said egress flow controller upon detection of said data flow restart signaling.

7. The method of claim 1, wherein a destination address of a special test cell is directed to a specific flow controller with regard to a unicast switchover.

8. The method of claim 1, wherein special test cells arrive at all leaves of a multicast data transmission, the test cells including a field used to select a particular flow controller address for switchover of said data flow.

9. The method of claim 5, wherein a SOF test cell for a flow controller corresponding to an offline data flow is not scheduled until an EOF test cell has been dequeued from the flow controller corresponding to the online data flow.

10. The method of claim 2, wherein VOQ backpressure is asserted to an ingress flow controller once a valid switchover communication is received regarding a corresponding VOQ, thereby enabling FIFOs in said ingress flow controllers to drain.

11. The method of claim 5, wherein a flow controller for an offline data flow uses an offset counter to detect that a SOF cell is at the head of a VOQ.

12. The method of claim 1, wherein said flow controllers include a function for aggregation of various data flows.

13. The method of claim 1, wherein said flow controllers further include an arbiter function for selection of said data flows.

14. A multiservice packet based switch apparatus capable of performing a switchover of data flows from a first data flow to a second redundant data flow without data loss, said apparatus comprising:
at least two redundant switching cores; and
a plurality of ingress and egress communications traffic flow controllers coupled to said switching cores, each of said flow controllers directing one or more threads of said communications traffic over one or another of said redundant switching cores;
respective ones of said flow controllers monitoring corresponding communications flow paths traversing said ingress flow controller, one of said redundant switching cores and said egress flow controller;
wherein, in response to a need for switching at least a portion of said data flows to said redundant data flow path, an ingress flow controller causes an interruption of said at least a portion of said data flow and signals the occurrence of said interruption to an egress flow controller in a traffic thread from said ingress flow controller, and further wherein said interruption signaling identifies a switchover of at least a portion of said data flows to a path including said another switching core;
said ingress flow controller waiting an interval after said interruption and thereafter causing said least a portion of said data flows to be restarted, and providing a signal to said egress flow controller indicative of said data flow restart and directing a switchover by said egress flow controller to said another switching core path, and said data flows from said path traversing said another core are accepted thereafter.

15. The method of claim 14, wherein one or more virtual output queues (VOQ) exist for a particular egress flow controller, switching from said first data flow to said second redundant data flow being accomplished on a per VOQ basis.

16. The method of claim 14, wherein monitoring of data flows is accomplished using link test cells generated from a link test cell generator in said ingress flow controller to a link test cell receiver in said egress flow controller.

17. The method of claim 16, wherein said interruption signaling is given by an end-of-flow (EOF) test cell.

18. The method of claim 16, wherein said data flow restart signaling is given by a start-of-flow (SOF) test cell.

19. The method of claim 14, wherein said egress flow controller includes a filter table which is altered upon detection of said data flow restart signaling.

20. The method of claim 14, wherein a destination address of a special test cell is directed to a specific flow controller with regard to a unicast switchover.

21. The method of claim 14, wherein special test cells arrive at all leaves of a multicast data transmission, the test cells including a field used to select a particular flow controller address for switchover of said data flow.

22. The method of claim 18, wherein a SOF test cell for a flow controller corresponding to an offline data flow is not scheduled until an EOF test cell has been dequeued from the flow controller corresponding to the online data flow.

23. The method of claim 15, wherein VOQ backpressure is asserted to an ingress flow controller once a valid switchover communication is received regarding a corresponding VOQ, thereby enabling FIFOs in said ingress flow controllers to drain.

24. The method of claim 18, wherein a flow controller for an offline data flow includes an offset counter to detect that a SOF cell is at the head of VOQ.

25. The method of claim 14, wherein said flow controllers include a function for aggregation of various data flows.

26. The method of claim 23, wherein said flow controllers further include an arbiter function for selection of said data flows.

27. A multiservice packet based switch apparatus capable of performing a switchover of data flows from a first data flow to a second redundant data flow without loss of data, said apparatus comprising:
at least two redundant switching cores; and
a plurality of arbiter and aggregator devices coupled to either side of said switching cores, wherein during said switchover an ingress arbiter device in line with data flows proceeding to at least two corresponding aggregators inserts an end of flow indication to the corresponding aggregators causing each data flow of a selected virtual output queue to stop,
a first aggregator indicating to a second of said aggregators when it has stopped traffic of a particular data flow, wherein said second aggregator after stopping traffic of its data flow notifies a corresponding egress arbiter of said stopping via said end of flow indication, wherein said egress arbiter switches to said second data flow thereafter.

28. The apparatus of claim 27, wherein said egress arbiter switches to said second data flow after receiving an end of flow indication from each of said at least two aggregators.

29. The apparatus of claim 28, wherein said end of flow indication instructs said egress arbiter regarding which of said switching cores to be switched.

30. The apparatus of claim 27, wherein said egress arbiter receives a start of flow indication for restarting said data flows.

* * * * *